United States Patent
Holmes et al.

(10) Patent No.: US 8,762,424 B2
(45) Date of Patent: *Jun. 24, 2014

(54) GENERATING VIEWS OF SUBSETS OF NODES OF A SCHEMA

(75) Inventors: John C. Holmes, Stratham, NH (US);
Ming Jiang, Cary, NC (US); Jeff J. Li, Boca Raton, FL (US); Yong Li, Newton, MA (US); David S. Sotkowitz, Sharon, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/358,421

(22) Filed: Jan. 25, 2012

(65) Prior Publication Data

US 2013/0191421 A1     Jul. 25, 2013

(51) Int. Cl.
*G06F 17/30* (2006.01)

(52) U.S. Cl.
CPC .............................. *G06F 17/30002* (2013.01)
USPC ........................... 707/805; 707/829; 715/853

(58) Field of Classification Search
USPC ......... 707/755, 778, 797, 802–812, 828, 829; 715/234, 853
See application file for complete search history.

(56) References Cited

U.S. PATENT DOCUMENTS

| | | | |
|---|---|---|---|
| 6,912,538 B2 | 6/2005 | Stapel et al. | |
| 7,043,487 B2 | 5/2006 | Krishnamurthy et al. | |
| 7,877,416 B2 | 1/2011 | Chari et al. | |
| 8,150,893 B2 | 4/2012 | Bohannon et al. | |
| 8,209,361 B2 | 6/2012 | Idicula et al. | |
| 2004/0015783 A1* | 1/2004 | Lennon et al. | 715/523 |
| 2004/0044959 A1 | 3/2004 | Shanmugasundaram et al. | |
| 2007/0073734 A1 | 3/2007 | Doan et al. | |
| 2007/0143331 A1 | 6/2007 | Holtz et al. | |
| 2008/0134139 A1 | 6/2008 | Krouse et al. | |
| 2009/0006316 A1 | 1/2009 | Fan et al. | |
| 2009/0144293 A1 | 6/2009 | Chowdhury | |
| 2010/0057760 A1 | 3/2010 | Demant et al. | |
| 2010/0235725 A1 | 9/2010 | Drayton et al. | |

OTHER PUBLICATIONS

Amir Bar-Or et al., Using the XML transformation capabilities in IBM InfoSphere DataStage 8.5, Part 3: Understanding validation rules, Apr. 28, 2011, Google, 1-17.*

(Continued)

*Primary Examiner* — Jean B Fleurantin
(74) *Attorney, Agent, or Firm* — David W. Victor; Konrad, Raynes, Davda & Victor LLP

(57) ABSTRACT

Provided are a computer program product, system, and method for processing schemas in a storage system. A presentation of a schema in a graphical user interface (GUI) is comprised of multiple type nodes in a tree structure. Each type node comprises a hierarchical arrangement of a plurality of nodes including group nodes including a plurality of nodes and content nodes providing values. First user input selects one of the type nodes in the schema for a view. Second user input selects one of the nodes in the selected type node in the schema for a view. Third user input selects a node in the schema to indicate a root node of the schema for the view. The view includes the root node and at least one sub node of the root node and is added as a child to the selected type node.

30 Claims, 12 Drawing Sheets

(56) References Cited

OTHER PUBLICATIONS

Chen, L., X. Xiong, and D. Zhang, "Transform and Integrate Data Using WebSphere DataStage XML and Web Services Packs", Mar. 29, 2007, [online], [Retrieved on Jan. 5, 2012]. Retrieved from the Internet at <URL: http://www.ibm.com/developerworks/data/library/techarticle/dm-0703xiong/>, Total 35 pp.

Barnak, B., A. Bar-Or, C.M. Saracco, and P. Stanley, "IBM InfoSphere DataStage and DB2 pureXML, Part 1:Integrate XML Operational Data into a Data Warehouse", Aug. 20, 2009, © IBM Corporation 2009, Total 35 pp.

Barnak, B., A. Bar-Or, C.M. Saracco, and P. Stanley, "IBM InfoSphere DataStage and DB2 pureXML, Part 2: Building an XML-enabled Data Warehouse", Sep. 3, 2009, © IBM Corporation 2009, Total 19 pp.

Alur, N., C. Takahashi, S. Toratani, and D. Vasconcelos, "IBM InfoSphere DataStage Data Flow and Job Design", Jul. 2008, First Edition, © International Business Machines Corporation 2008, Total 658 pp.

Bar-Or, A. and S. Choudhary, "Using the XML Transformation Capabilities in IBM InfoSphere DataStage 8.5, Part 1: Transform XML Using the DataTage XML Stage: New Capabilities Parsin and Composing XML Files", © IBM Corporation 2011, Total 24 pp.

Bar-Or, A. and S. Choudhary, "Using the XML Transformation Capabilities in IBM InfoSphere DataStage 8.5, Part 2: Understanding the Assembly", © IBM Corporation 2011, Total 27 pp.

U.S. Patent Application, filed Jan. 25, 2012, entitled "Using Views of Subsets of Nodes of a Schema to Generate Data Transformation Jobs to Transform Input Files in First Data Formats to Output Files in Second Data Formats", invented by Holmes, J.C., M. Jiang, J.J. Li, Y. Li, and D.S. Sotkowitz, Total 46 pp.

Amendment 1, Jun. 10, 2013, for U.S. Appl. No. 13/401,614, filed Feb. 21, 2012 by J.C. Holmes et al., Total 9 pp.

Office Action 1, Apr. 4, 2013, for U.S. Appl. No. 13/401,614, filed Feb. 21, 2012 by J.C. Holmes et al., Total 16 pp.

Office Action 1, Mar. 25, 2013, for U.S. Appl. No. 13/358,426, filed Jan. 25, 2012 by J.C. Holmes et al., Total 17 pp.

Office Action 1, Mar. 25, 2013, for U.S. Appl. No. 13/401,679, filed Feb. 21, 2012 by J.C. Holmes et al., Total 15 pp.

U.S. Appl. No. 13/401,614, filed Feb. 21, 2012, entitled "Generating Views of Subsets of Nodes of a Schema", invented by Holmes, J.C., M. Jiang, J.J. Li, Y. Li, and D.S. Sotkowitz, Total 33 pp.

U.S. Appl. No. 13/401,679, filed Feb. 21, 2012, entitled "Using Views of Subsets of Nodes of a Schema to Generate Data Transformation Jobs to Transform Input Files in First Data Formats to Output Files in Second Data Formats", invented by Holmes, J.C., M. Jiang, J.J. Li, Y. Li, and D.S. Sotkowitz, Total 43 pp.

Notice of Allowance for U.S. Appl. No. 13/358,426, dated Sep. 4, 2013, 18 pp.

Notice of Allowance for U.S. Appl. No. 13/401,679, dated Aug. 30, 2013, 15 pp.

Response to Office Action 1 for U.S. Appl. No. 13/358,426, dated Jun. 25, 2013, 7 pp.

Response to Office Action 1 for U.S. Appl. No. 13/401,679, dated Jun. 25, 2013, 5 pp.

Xi, H. et al., "Distributed Supply Chain Simulation Using a Generic Job Running Framework", In Proceedings of the 2003 Winter Simulation Conference, 2003, 8 pp.

Notice of Allowance 1, Aug. 20, 2013, for U.S. Appl. No. 13/401,614, filed Feb. 21, 2012 by J.C. Holmes et al., Total 17 pp.

IBM Corp., "Annotated XML Schema Decomposition and Recursive XML Documents", DB2 Version 9.5 for Linux, UNIX, and Windows, [online], [Retrieved on Aug. 18, 2013]. Retrieved from the Internet at <URL: http://publib.boulder.ibm.com/infocenter/db2luw/v9r5/index.jsp?topic=%2Fcom.ibm.db2.1uw.wn.doc%2Fdoc%2Fc0050661.html>, 5 pp.

Wikibooks, "XML—Managing Data Exchange/Recursive Relationships", [online], [Retrieved on Aug. 18, 2013]. Retrieved from the Internet at <URL: http://en.wikibooks.org/wiki/XML_-_Managing_Data_Exchange/Recurs>, 6 pp.

U.S. Appl. No. 14/070,468, filed Nov. 1, 2013, entitled "Using Views of Subsets of Nodes of a Schema to Generate Data Transformation Jobs to Transform Input Files in First Data Formats to Output Files in Second Data Formats", by Holmes, J.C., et al., 46 pp.

US Application, filed Jan. 6, 2014, entitled "Generating a View for a Schema Including Information on Indication to Transform Recursive Types to Non-Recursive Structure in the Schema", by Fischer, J.M., et al., 38 pp. [57.329 (Appln)].

US Application, filed Jan. 6, 2014, entitled "Limiting the Rendering of Instances of Recursive Elements in View Output", by Fischer, J.M., et al., 39 pp. [57.316 (Appln)].

Amendment for U.S. Appl. No. 13/358,426, dated Dec. 4, 2013, 8 pp.

Notice of Allowance 2 for U.S. Appl. No. 13/358,426, dated Dec. 24, 2013, 14 pp.

Chen, W., et al., "DB2 9 pureXML Guide", IBM Redbook, Jan. 2007, 35 pp.

Office Action 1, Feb. 13, 2014, for U.S. Appl. No. 14/070,468, filed on Nov. 1, 2013 by J.C. Holmes et al., Total 13 pp.

* cited by examiner

GENERATING VIEWS OF SUBSETS OF NODES OF A SCHEMA

BACKGROUND OF THE INVENTION

1. Field of the Invention

The present invention relates to a computer program product, system, and method for processing data represented by a schema.

2. Description of the Related Art

An Extensible Markup Language (XML) schema is a description of elements in a document encoded using the XML language. The XML schema may also be used to define a data model, also known as a meta model comprising a definition of a hierarchical representation of nodes that represent the data and relationship of data content for a data model. XML schemas that define more complex data models may have 1000s of nodes arranged in a complex hierarchy of trees of nodes. A large scale schema may be comprised of multiple XML Schema Definition (XSD) files and provides a definition of large scale trees of nodes and data content.

For instance, the financial industry uses FpML (Financial products Markup Language), which is an XML meta model providing a message standard for the financial industry, OTC Derivatives. The FpML meta model, version 4.9, groups more than 100 sub requests within 37×SD files. Another large scale schema is the ACORD family of XML specifications for Life, Annuity and Health that enables information exchanges among business partners, and one type in the schema has more than hundreds of sub-types.

There is a need in the art for improved tools for managing access of very large scale schemas and manipulating the data defined by such schemas.

SUMMARY

Provided are a computer program product, system, and method for processing schemas in a storage system. A presentation of a schema is generated in a graphical user interface (GUI) comprised of multiple type nodes in a tree structure, wherein each type node comprises a hierarchical arrangement of a plurality of nodes including group nodes including a plurality of nodes and content nodes providing values. First user input in the GUI is received selecting one of the type nodes in the schema for a view. Second user input in the GUI is received selecting one of the nodes in the selected type node in the schema for a view. Third user input in the GUI is received selecting a node in the schema to indicate a root node of the schema for the view. The view is generated and edited to include the root node and at least one sub node of the root node. The view is added as a child to the selected type node.

In a further embodiment, a presentation of a schema is generated in a graphical user interface (GUI) comprised of multiple type nodes in a tree structure, wherein each type node comprises a hierarchical arrangement of a plurality of nodes including group nodes including a plurality of nodes and content nodes providing values. First user input in the GUI is received selecting one of the nodes as a root view node of the view. Graphical controls are generated in the GUI enabling the user to add or remove sub nodes of the root view node to the view. User selection of the graphical controls is received to add at least one of the sub nodes of the root view node to the view. User selection of the graphical controls is received to remove at least one of the sub nodes of the root view node from the view. A view node is generated for the root view node and for each sub node the user selected to include in the view.

DETAILED DESCRIPTION

Described embodiments provide techniques to allow a user to define views of a large scale schema, where a view is defined as a subset of nodes and trees of nodes in the schema. The described embodiments allow a user to select a root view node and then select and deselect sub nodes of the root view node to include in the view. Views can be stored in a central repository and shared for different job designs. Further, described embodiments provide techniques to use multiple views in data transformation jobs.

Figure 1:
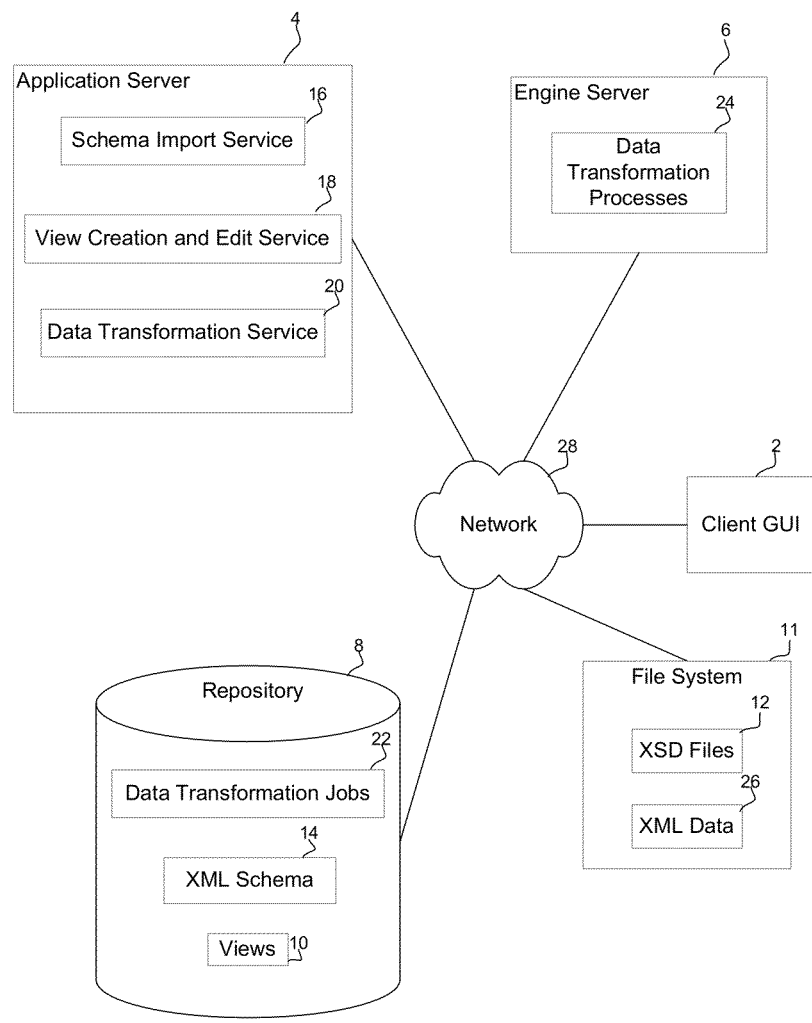
FIG. 1 illustrates an embodiment of a computing environment.

FIG. 1 illustrates an embodiment of a computing environment 1 including a computer with a client web graphical user interface (GUI) 2, an application server 4, an engine server 6, a repository 8, and a file system 11. Users access the client GUI 2 to import XSD files 12 from file system 11 and save the XML schema 14 defined by the XSD files 12 to the repository 8. The client GUI 2 invokes the schema import service 16 deployed on the application server 4 to import XSD files 12 and uses the view creation and edit service 18 to create views 10 of an XML schema 14 and save the views 10 to the central repository 8. The client GUI 2 invokes the view creation and edit service 18 deployed on the application server 4 to create and edit views 10.

The client GUI 2 uses the data transformation service 20 to design data transformation jobs 22, which are executed by data transformation processes 24 running in the engine server 6. The data transformation processes 24 executing a data transformation job 22 parse XML data content 26 defined by an XML schema 14 or composes XML data content 26 defined by an XML schema 14. The client GUI 2 utilizes the data transformation service 20 deployed on the application server 4 to create the data transformation jobs 22, which may be stored in the repository 8, and may be accessible to other clients. The views 10 in the repository 8 can be reused in multiple data transformation jobs 22.

The user accesses the client GUI 2 to invoke the data transformation service 20 to retrieve the data transformation jobs 22 from the repository 8 and invoke data transformation processes 24 that execute on the engine server 6 to run the data transformation job 22 to access or create XML data 26 in the file system 11.

The application server 4, engine server 6, client GUI 2, repository 8, and file system 11 may interconnect over a network 28. The components of FIG. 1 may be implemented with suitable computing architectures. In one embodiment, the client GUI 2 may be web based, invoking the services 16, 18, 20, 24, using SOAP (Simple Object Access Protocol) web services or Hypertext Transport Protocol (HTTP) based Representational State Transfer (REST) services. In one embodiment, the client GUI 2 and the services 16, 18, 20, and 24 may be integrated into one standalone application or distributed in multiple application components. The repository 8 may comprise a relational database or a non-relational database. The application server 4 and engine server 6 may be implemented on separate computers or machines or implemented within the same computer and operating system environment.

The repository 8 and file system 11 may be implemented in storage media in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, solid state disks (SSDs), flash disk, storage-class memory (SCM)), electronic memory, etc. The repository 14 and file system 11 may be implemented in the same or different storage devices. The network 28 may comprise an interconnected network (e.g., Intranet, Internet, Local Area Network (LAN), Storage Area Network (SAN), etc.) or comprise direct cable connections between the separate computers implementing the components 4, 6, 2, 8, and 11.

In described embodiments, the schema 14 comprises an XML schema. In alternative embodiments, the schema 14 may be implemented in suitable structured document definition languages other than XML. Further, the XML schema may comprise a text-based meta-language for describing data shared between applications as defined for an industry group.

Figure 2:
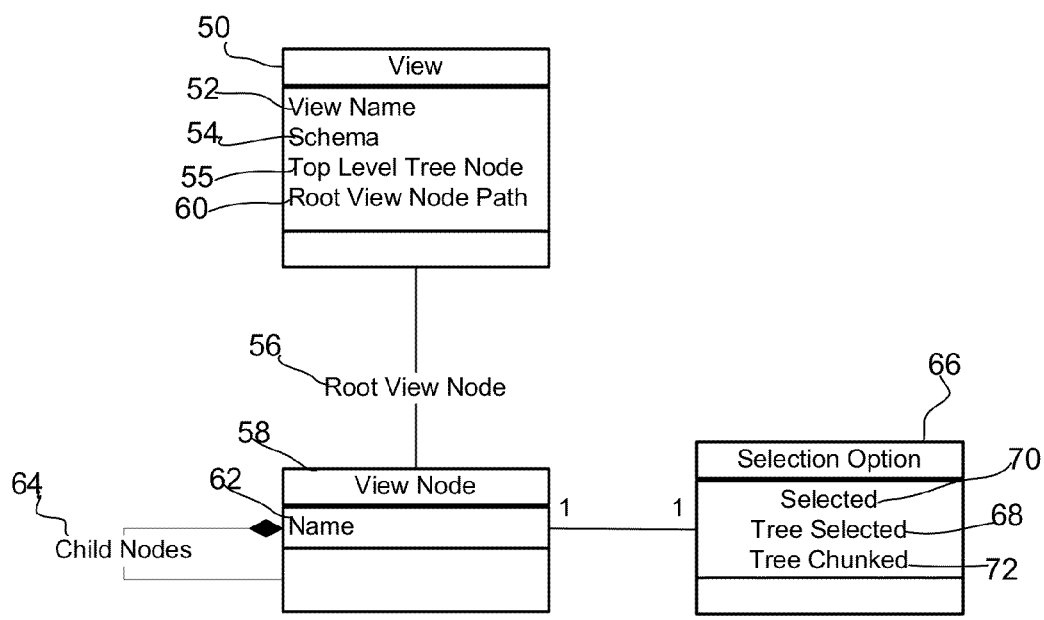
FIG. 2 illustrates an embodiment of a view definition.

FIG. 2 illustrates an embodiment of a view definition 50, providing a definition of one of the views 10, created by the view creation and edit service 18, and stored in the repository 8. The view definition 50 includes a view name 52 or identifier of a view 10; a schema 54 identifying the schema 12 from which the view 52 was generated; a top level tree node 55 identifying the tree in the schema 54 from which the view was generated, a root view node 56 which points to a view node 58 to indicate the node tree for the view 50; and a root view node path 60 indicating the path of the root view node 56 in the tree represented by the tree node 55 in the schema 54 for which the view 50 is generated. Each view node 58 in a view 50 has a matching node in the schema 54. The root view node 56 matches to the node in the schema 54, which can be reached by starting from the root of tree represented by the tree node 55 in the schema 54 and travelling based on the root view node path 60. A view node 58 in a view 50 contains a node name 62 which is the name of the matching node in the schema 54. The view node 58 can have multiple child nodes 64 in the same way as the matching node for the view node 58 can have multiple child nodes in the schema 54. Each child node 64 of the view node 58 is also a view node 58 which can contain its own child nodes.

Each view node 58 may contain a user selection option 66. A tree selected 68 attribute indicates that the node in the schema 54 represented by the view node 58 and all the descendant nodes for the node in the schema 54 represented by the view node 58 are selected in the view 50. A tree selected 68 view node 58 has no child nodes 64 in the view 50. The view creation and edit service 18 and data transformation service 20 automatically deduce from the tree selected 68 attribute that all the descendants of the node in the schema 54 represent by a tree selected view node 58 are selected in the view 50.

The selected 70 attribute indicates that the node in the schema 54 represented by the view node 58 is selected to include in the view 50, and that a subset of the descendants of the node in the schema 54 represented by the view node 58 are included in the view, but not all descendant nodes. The view nodes 58 created for the children will have selection options 66 indicating the status of the child nodes in the view. View nodes 58 would not be created for sub nodes of the root view node 56 that the user deselected or selected to not include in the view. Thus, the view nodes 58 define a view to only include the sub nodes of a root view node indicated as included in the view.

A tree chunked 72 attribute indicates that the node in the schema 54 represented by the view node 58 is selected in the view 50 and the data described by the node tree rooted from the node in the schema 54 represented by the view node 58 is to be processed as a simple XML data chunk. The descendants of the node represented by the view node 58 will not be included the view 50. When the data transformation service 20 processes a view node 58 with the option of tree chunked 72 selected, the data transformation service 20 treats the data chunk in the XML data, described by the node tree rooted from the node in the schema 54 represented by the view node, as a simple string including all the data for the tree from the view node 58 that is chunked. A separate view 50 can be created to model the data for a chunked view node and its related descendants.

Figure 3:
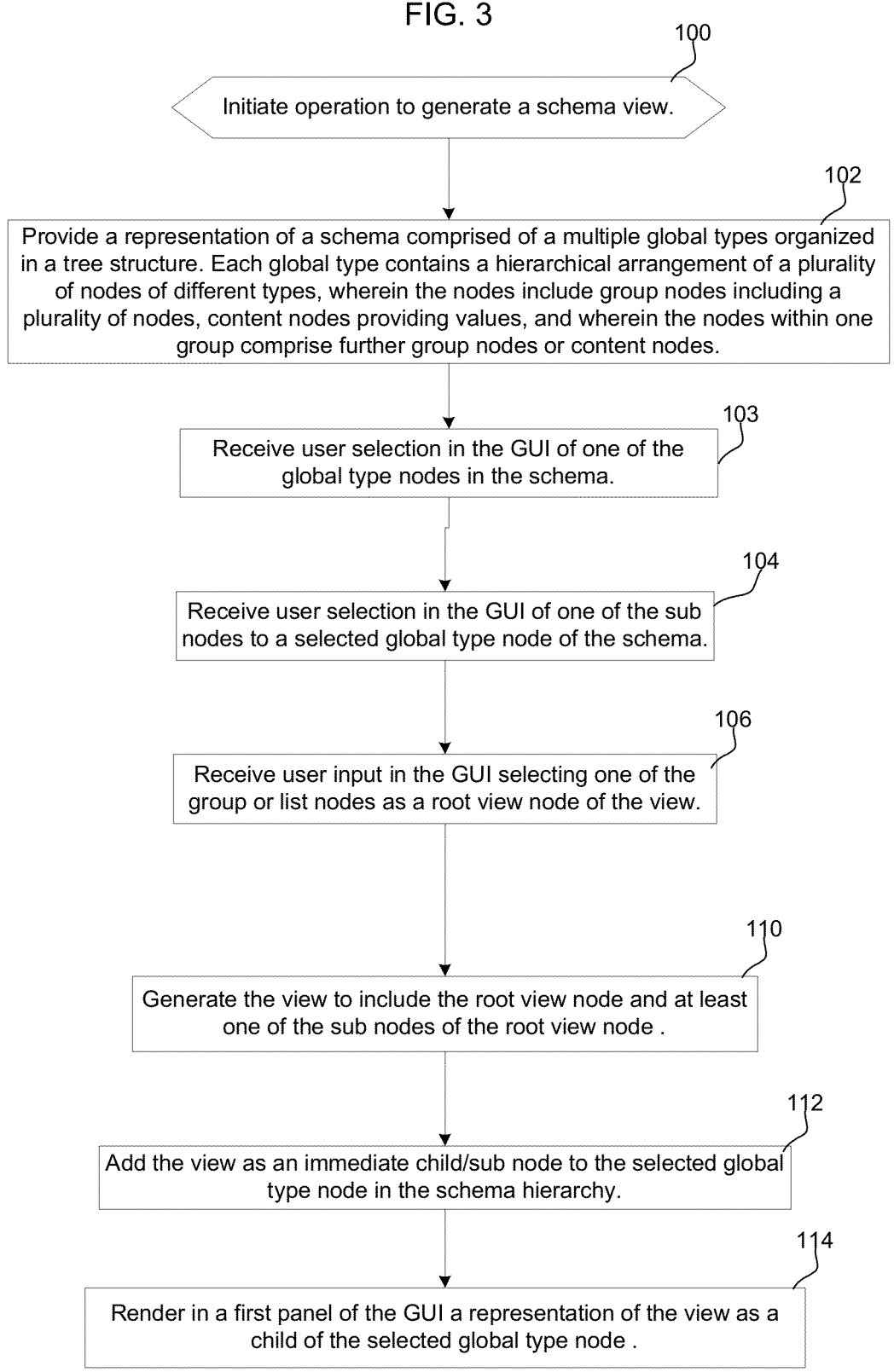
FIGS. 3 and 4 illustrate embodiments of operations to create a view of a schema.
Figure 4:
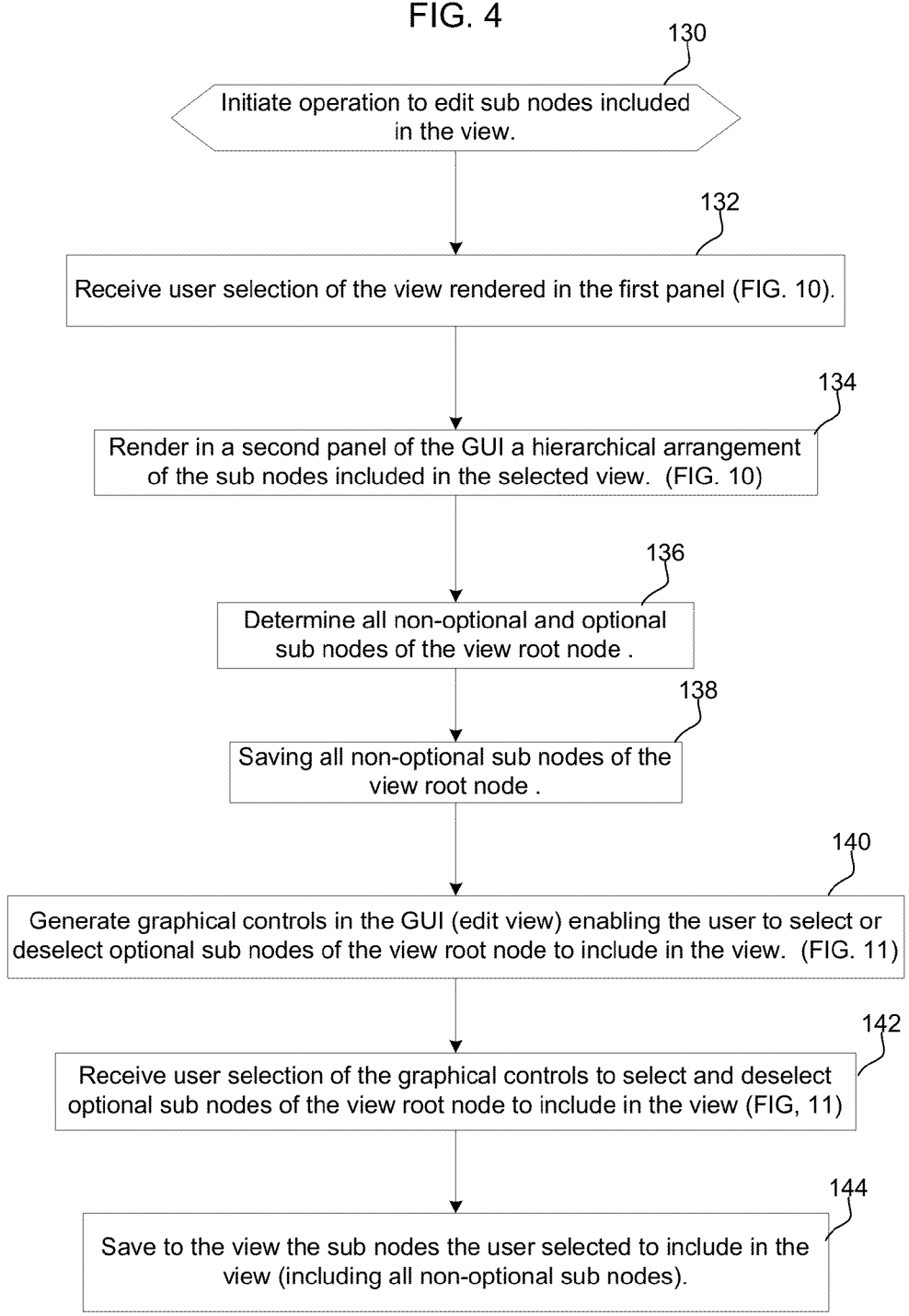
Figure 5:
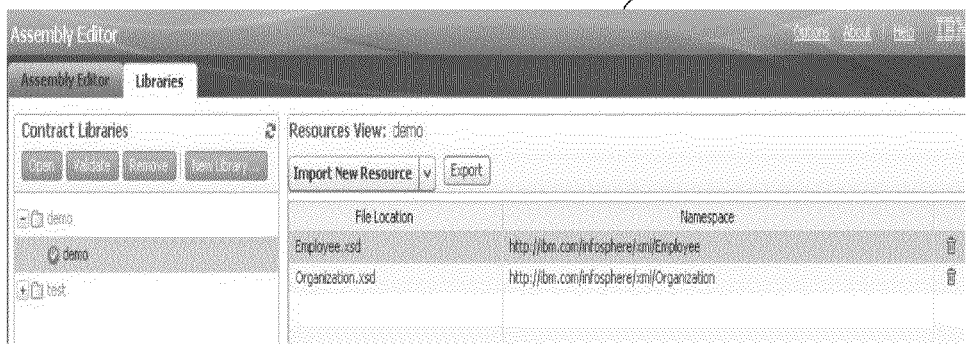
FIGS. 5-13 illustrate an embodiment of graphical user interfaces (GUIs) used to create views.

FIGS. 3 and 4 illustrate embodiments of operations performed by the application server 4 components, such as the schema import service 16 and the view creation and edit service 18 to enable the user to create and update a view 10 comprising a set of nodes of an XML schema 12. FIGS. 5-13 illustrate examples of Graphical User Interfaces (GUIs) to enable the user to interact with a representation of a schema 14 to create views 10. Upon initiating (at block 100) the operations to create a view 10, the application server 4 provides (at block 102) the client GUI 2 a representation of a schema 12 comprised of multiple global types or global type nodes. Each global type node comprises a hierarchical arrangement of a plurality of nodes of different types, wherein the nodes include group nodes including a plurality of nodes, content nodes providing values, choice nodes, list nodes, and choice lists. FIG. 5 illustrates an embodiment of a GUI 190 provided by the schema import service 16 in which the user may select XSD files 12 that the user may import for use in generating a view 10 from the schema defined in the selected XSD files 12 to import.

Figure 6:
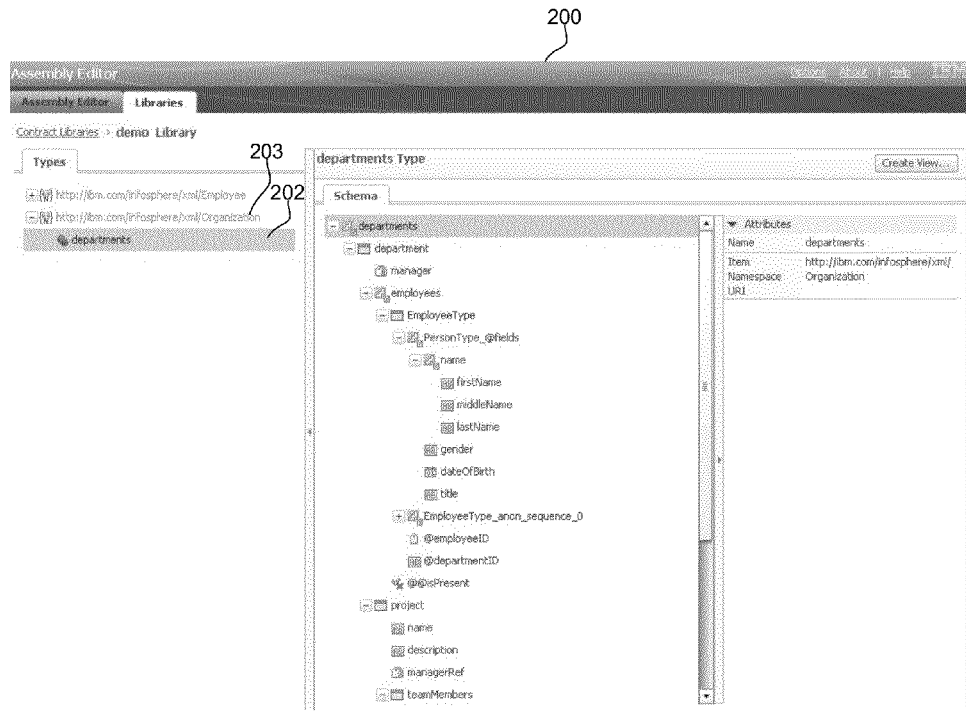

FIG. 6 illustrates multiple global types for the imported XSD files, organized in a hierarchical structure in the left panel. The "departments" node 202, under the namespace node 203 in the left panel represents one global type or element in the imported XSD files. The global type "departments" has a schema comprising various nodes organized in a tree structure as shown in the middle panel. After selecting XSD files 12 to import using the schema import services 16, the user may invoke the view creation and edit service 18 to present to the client GUI 2 the GUI 200 shown in FIG. 7, which shows a representation of the schema for the global type "departments" defined in the selected XSD files 12 comprising a hierarchical arrangement of a plurality of nodes and sub nodes, where the root node of the schema for the global type has various sub nodes, such as manager, employees, project, which have further sub nodes and attributes of the sub nodes. With respect to FIGS. 3, 6, and 7, the view creation and edit services 18 receives (at block 103) user selection in the GUI 200 of one of the global type nodes in the schema and receives (at block 104) user selection in the GUI 200 of one of the global types (e.g. departments), one of the sub nodes (e.g., project 206) to create a view for the project sub node. The view creation and edit service 18 provides the GUI 200 with the options to create the view for project with the project node as the root view node 56 node or with the ancestor node "departments" as the root view node 56. The project sub node 206 has attributes of name and description and a sub node of teamMembers.

Figure 7:
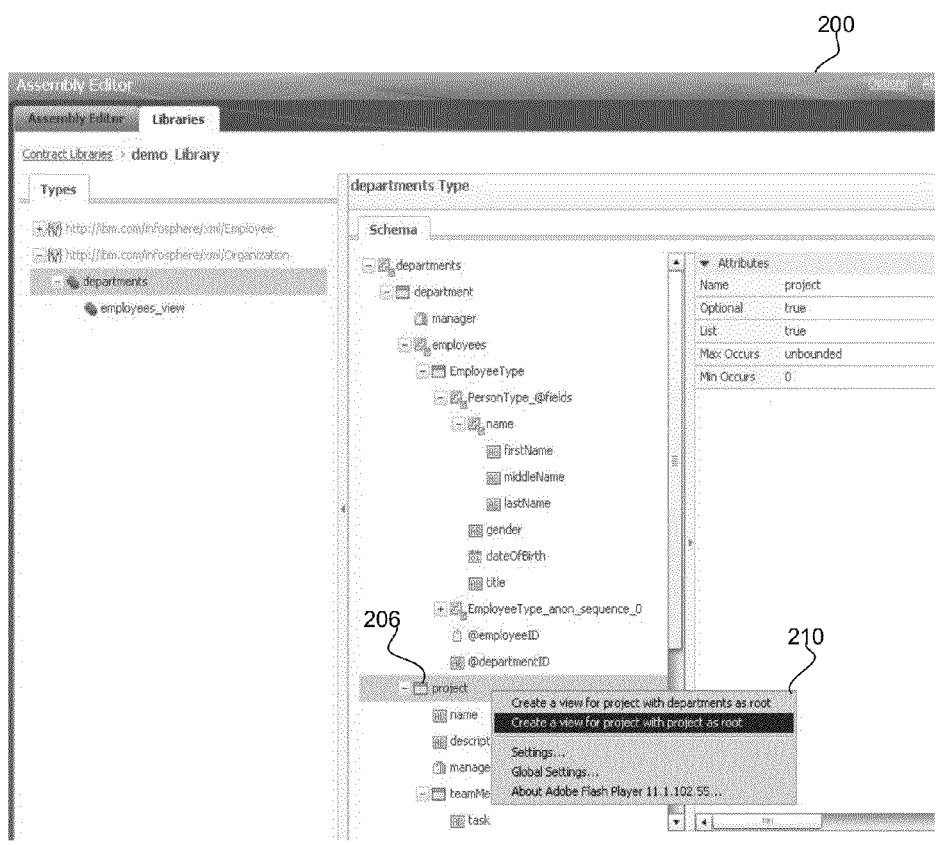
Figure 8:
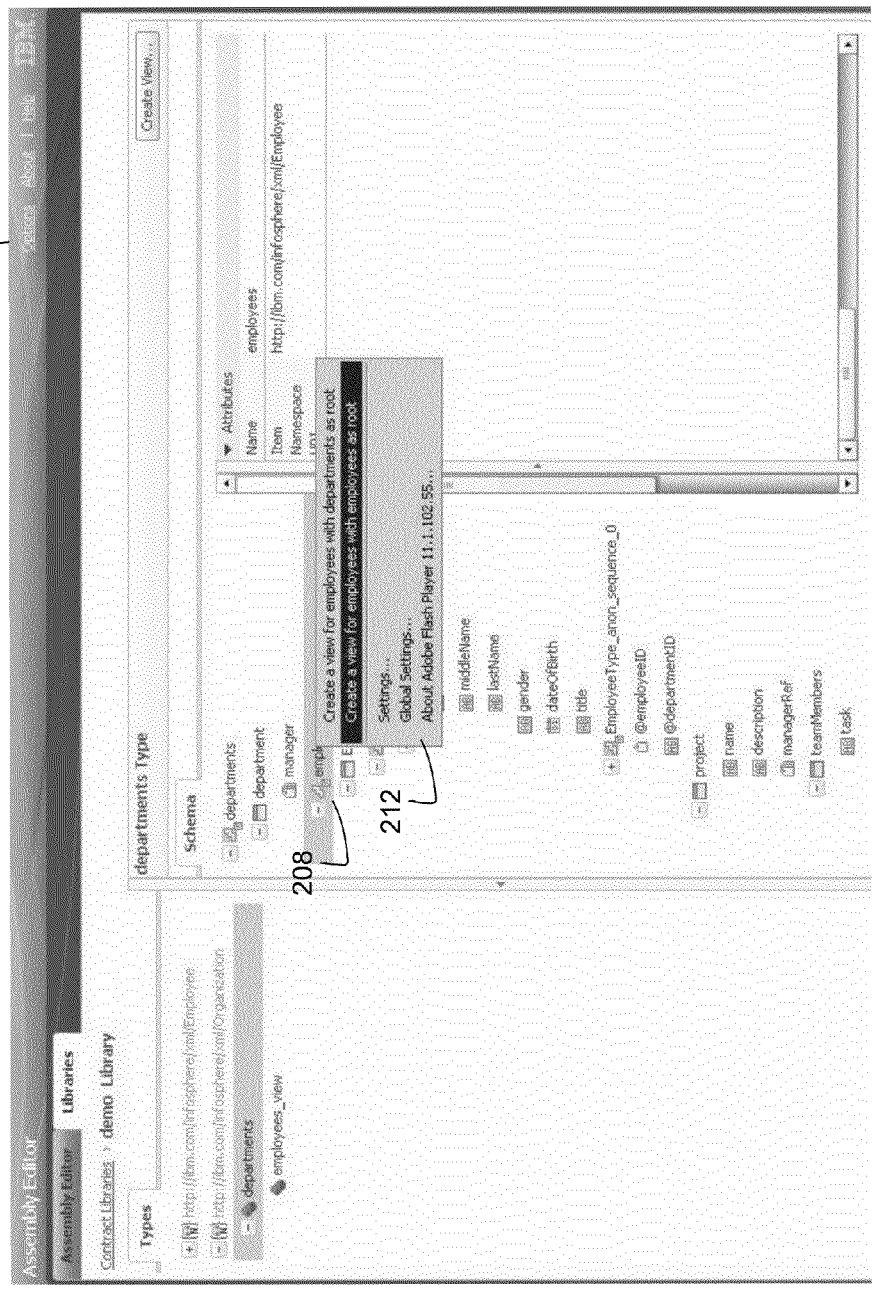
Figure 9:
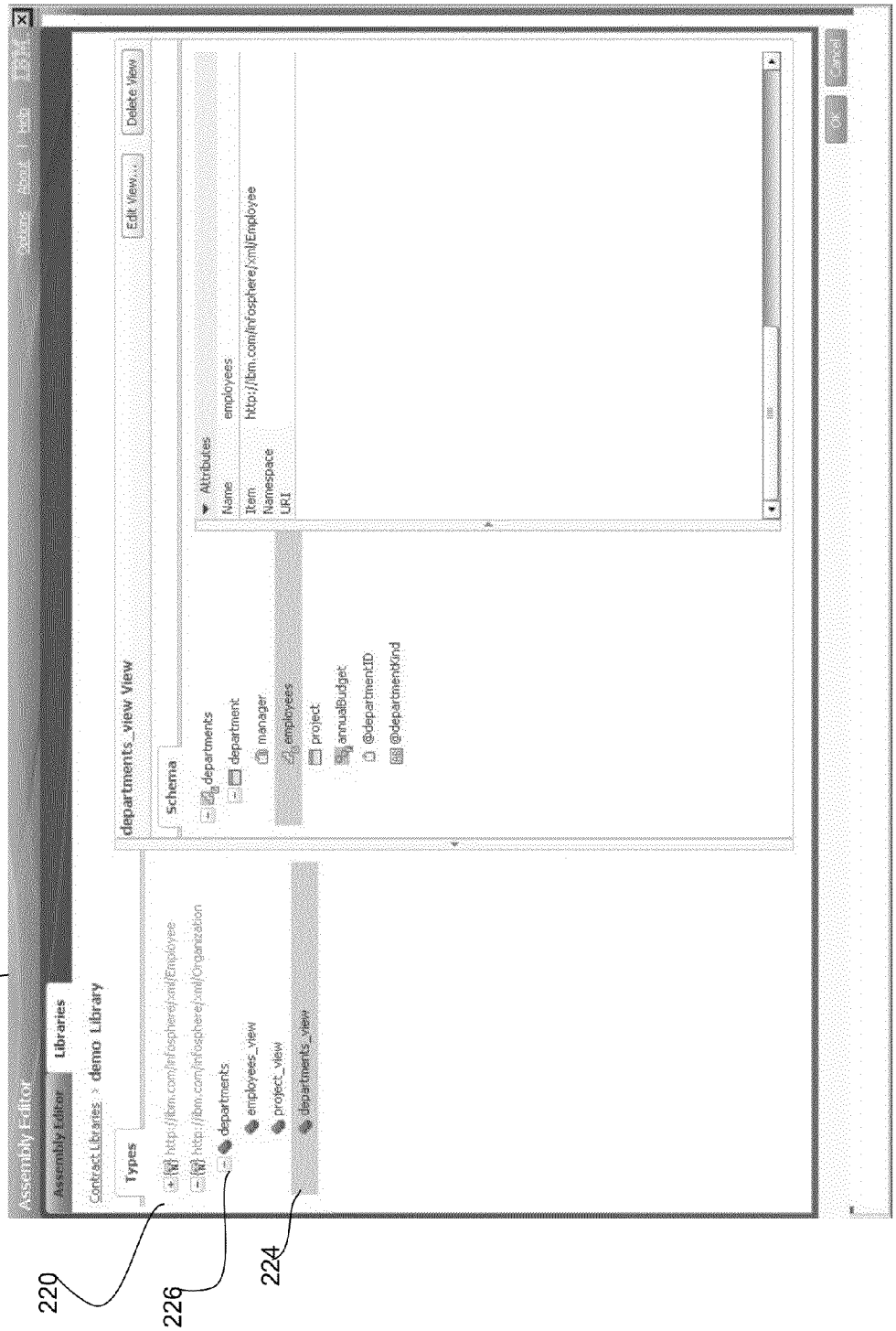

The view creation and edit service 18 receives (at block 106) user input in the GUI 200 (FIG. 8) selecting one of the global types as the top level tree node 55 and one of the sub nodes as a root view node 56. In FIG. 7, the user has selected to create the project view with the departments type node in the schema as the top level tree node 55 and the project node in the schema as the root view node 56. FIG. 8 illustrates the GUI 200 in which the user has selected to create a view of the employee node 208, with the departments type node being the top level tree node 55 and the employee node being the root view node 56, or the node tree for the view. The user may create the view by selecting the nodes 206 and 208 in FIGS. 7 and 8, and then right clicking to display menus 210 and 212 to display actions to allow the user to create the view with a root view node 56 for the view, which is the root of the view in the schema 54. With respect to FIGS. 7 and 8, the user is given two options in the menus 210 and 212 to create the view with one of root view nodes. FIG. 9 shows in the GUI 200 that the user has created the employees_view, project_view, and departments_view with the departments type node 226 in the schema as the top level tree node 55.

The view creation and edit service 18 generates (at block 110) the view 10, such as by generating a view 50 (FIG. 2), to include the root view node 56 comprising the root of the node tree for the view 50. The user may select certain sub nodes of the root view node 56 and indicated as tree selected 68, in which all their sub nodes and sub trees are part of the view 58, as selected 70 to include in the view 50, and deselect other sub nodes of the root view node 56 to not include in the view 50. The user may unselect a sub node of the root view node so that that sub node and all sub nodes in the sub tree of that deselected sub node are not included in the view 52 being generated. For each sub node selected to add to the view, a view node 58 may be generated, with the appropriate selection option 66 selected for that particular view node 58.

The view creation and edit service 18 adds (at block 112) the view as an immediate child/sub node to the selected global type node. The view creation and edit service 18 renders (at block 114) the view 10 as a child of the selected global type node in the client GUI 2. FIG. 9 illustrates an embodiment where a first panel 220 in the GUI 200 renders a representation of the employees_view, project_view, and departments_view as the immediate child of the selected global type node "departments" 224.

Figure 10:
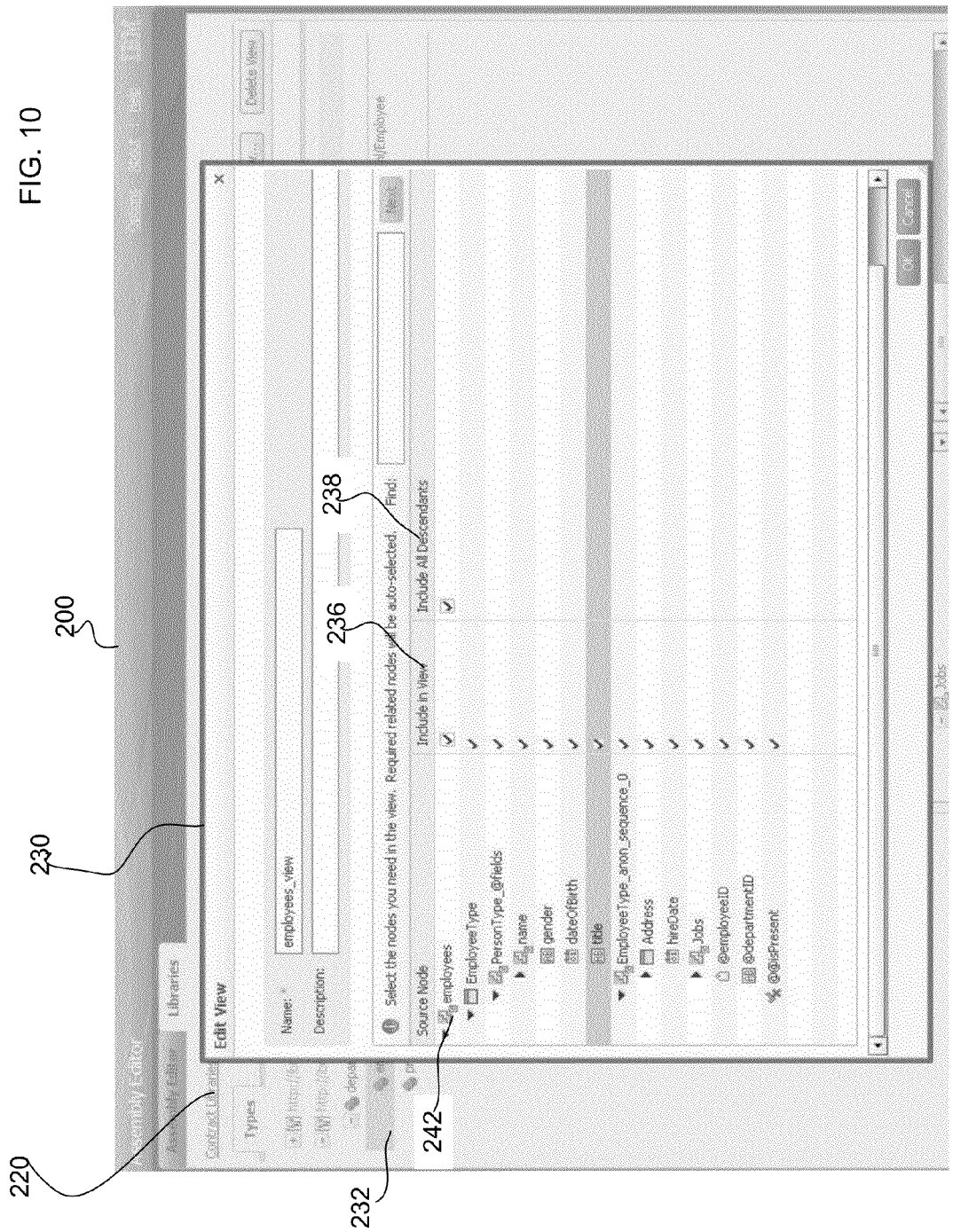

FIG. 4 illustrates an embodiment of operations performed by the view creation and edit service 18 to allow the client GUI 2 to edit the sub nodes included in the view 10, such as by selecting and deselecting sub nodes of the root view node 56. Upon initiating (at block 130) the operation to edit the sub nodes included in the view 10, the view creation and edit service 18 receives (at block 132) user selection of a view 10. FIG. 10 illustrates the user selection 230 of the "employee_view" in panel 220 of the GUI 200. A second panel of the GUI 230 (FIG. 10) renders (at block 134) a hierarchical arrangement of the nodes in the selected view.

To enable the user to select or deselect sub nodes of the root view node to include (select) or remove (deselect) from the view 10, the view creation and edit service 18 determines (at block 136) all non-optional and optional sub nodes of the root view node 56. Optional nodes comprise sub nodes that are not required for the root view node 56 and any further non-optional sub nodes. Non-optional nodes comprise sub nodes that are required for the root view node 56 or non-optional sub-nodes of the root view node 56. In certain embodiments, non-optional sub nodes of the root view node are saved (at block 138) to the view 10 being generated because they are required. A view node 58 may be created for each non-optional sub node included in the tree, and they may be indicated as tree selected 68 or selected 70. The view creation and edit service 18 generates (at block 140) graphical controls in an edit view 230 of the GUI 200 (FIG. 11) enabling the user to select (add) or deselect (remove) optional sub nodes of the root view node 56 for the view.

As shown in FIG. 10, the edit view 230 for a selected view 232 (e.g., "employee_view") provides "Include in view" 236 graphical controls to enable the user to select and deselect sub nodes of the selected view 232 to select (include) and deselect (remove) sub nodes from the view being generated. The edit view 230 may further provide an "Include all Descendants" graphical control 238 to enable the user to select to automatically include all descendant of a sub node in the view being generated. Selection of the "Include all descendants" control for the employees sub node 242 automatically selects all the sub nodes 244 of the employee sub node 242 to include in the employee view 232 being generated. Non-optional or mandatory nodes that must be included in the view 232 for the selected sub node 242 would be included in the view, and the "Include in view" 232 graphical control for such non-optional sub nodes of a selected sub node to include would be disabled or not selected to not allow the user to deselect that non-optional sub node from the view being generated.

The view creation and edit service 18 receives (at block 142) user selection of the graphical controls in the edit view 230 to select and deselect sub nodes of the parent view node to add or remove to the view 10. The view creation and edit service 18 saves (at block 144) to the view 10 being generated, e.g., employee_view 232 the optional sub nodes the user selected to include in the view and all non-optional sub nodes. For each sub-node, optional or non-optional included in the view, a view node 58 is created with the selection option 66 indicated for that sub node included in the view. In certain embodiments, the non-optional sub nodes of the selected optional nodes will be part of the view 10, but do not need to be saved explicitly in the view definition because the view creation and edit service 18 can infer their inclusion based on the selected optional sub nodes.

Created views 10 may be stored in the repository 8 for later retrieval by different users using different client GUIs 2 to invoke the data transformation service 20 to utilize the view in data transformation jobs 22 being generated for execution on the engine server 18. Further, the user may later retrieve a view 10 from the repository 8 using the view creation and edit service 18 to modify a stored view 10 by adding or removing sub nodes from the view.

Figure 11:
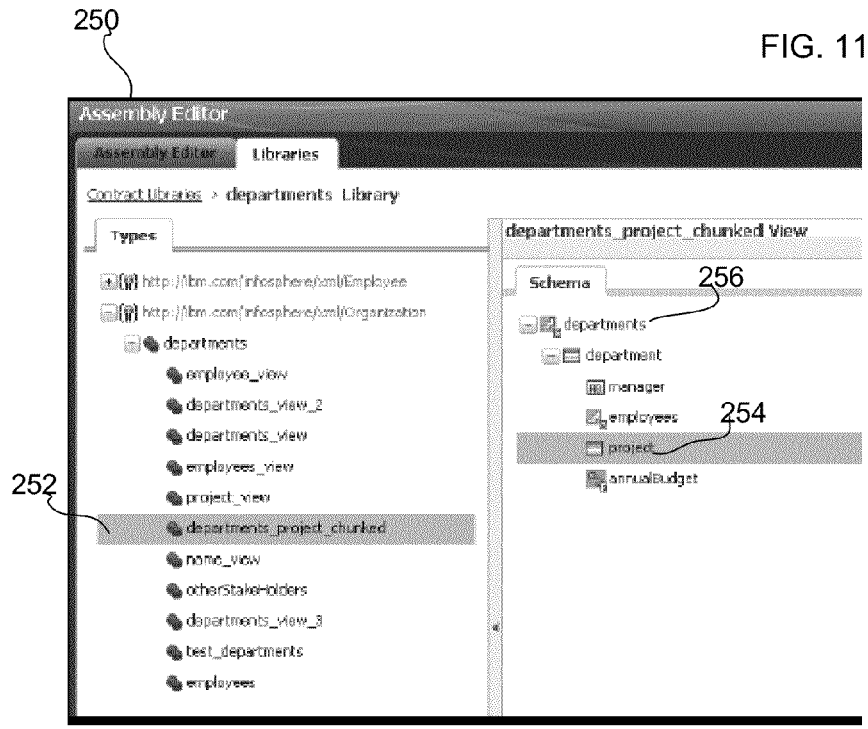
Figure 12:
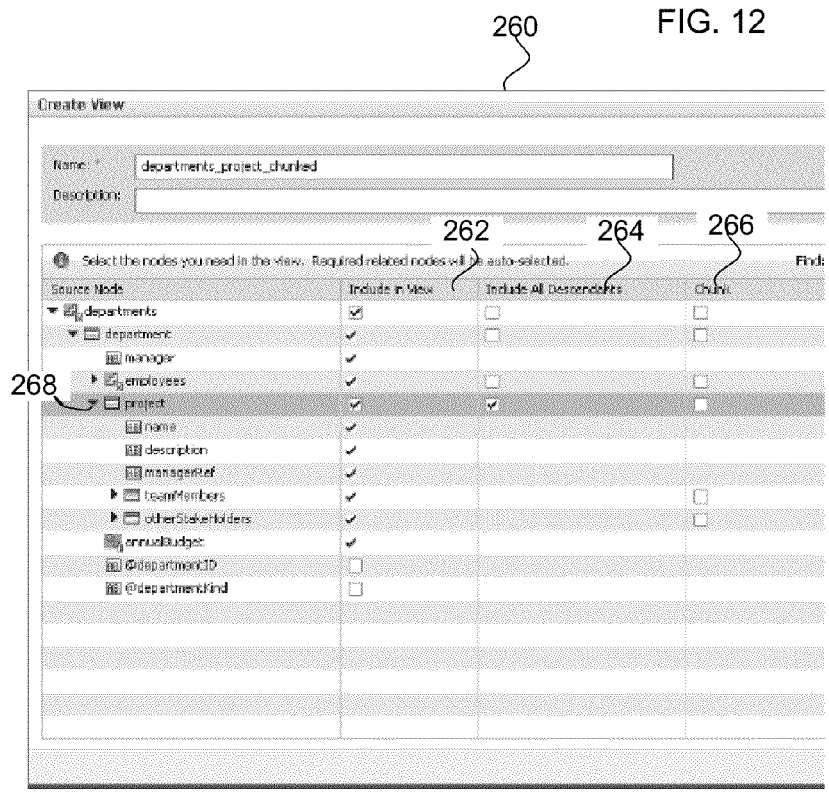
Figure 13:

FIGS. 11-13 illustrate a further embodiment of how the view creation and edit service 18 may present GUIs to allow the user to specify that a node in a view should be chunked. A chunked node comprises a sub-node of the schema at which data for the sub-node and the sub nodes of the selected sub-node are consolidated into a string and stored at the sub-node. FIG. 11 shows a GUI 250 presenting a plurality of views including one view 252, where the project sub-node 254 of the departments group node 256 is chunked.

FIG. 12 illustrates a create view GUI 260 to allow the user to control the creation and edit service 18 to add nodes to a view 10. The GUI 260 provides the previously discussed "Include in view" 262 and "Include all descendants" 264 columns, as well as a chunk column 266. The chunk column 266 enables the user to indicate to chunk a particular node, such as the project node 268 in the example of the GUI 260. Designating a node as a chunk node by selecting the box in the chunk column 266 causes the XML data chunk for the node and all the descendant sub-nodes be consolidated in a simple string stored in the chunked node 268.

FIG. 13 illustrates an embodiment of the GUI 260 after the project node 268 is chunked, which causes all the check boxes for all of the chunked project node's 268 descendants to disappear because, by definition, the descendants of a chunked node will not be included in the view schema.

In the view definition 50 (FIG. 2), the view node 58 for the node that is chunked will be marked as Tree Chunked 72 to indicate the node is chunked, as opposed to Selected 70 or Tree Selected 68. When a job 22 is run using a view 10 that has one or more chunked nodes, the chunked nodes have a data type of "XML" (regardless of the data types of the original nodes). Corresponding XML data for the chunked node and descendant nodes of the chunked node is not manipulated, but stored in the chunked node as a string of data, and passed to the job as a data string.

The described embodiments provide techniques to create views that maintain information on a subset of nodes of a schema to make available to a user to analyze the subset of the schema represented by the view. This allows the user to decompose portions of interest of a large scale schema comprised of many thousands of nodes, such as an industry standard meta language. Described embodiments provide graphical controls to allow the user to select and deselect sub nodes of a root view node in the schema to add or remove to the view. The views comprise manageable and reusable subsets of nodes for viewing and analysis and for generating content from a database for a specific subset of the nodes of the schema.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 14:
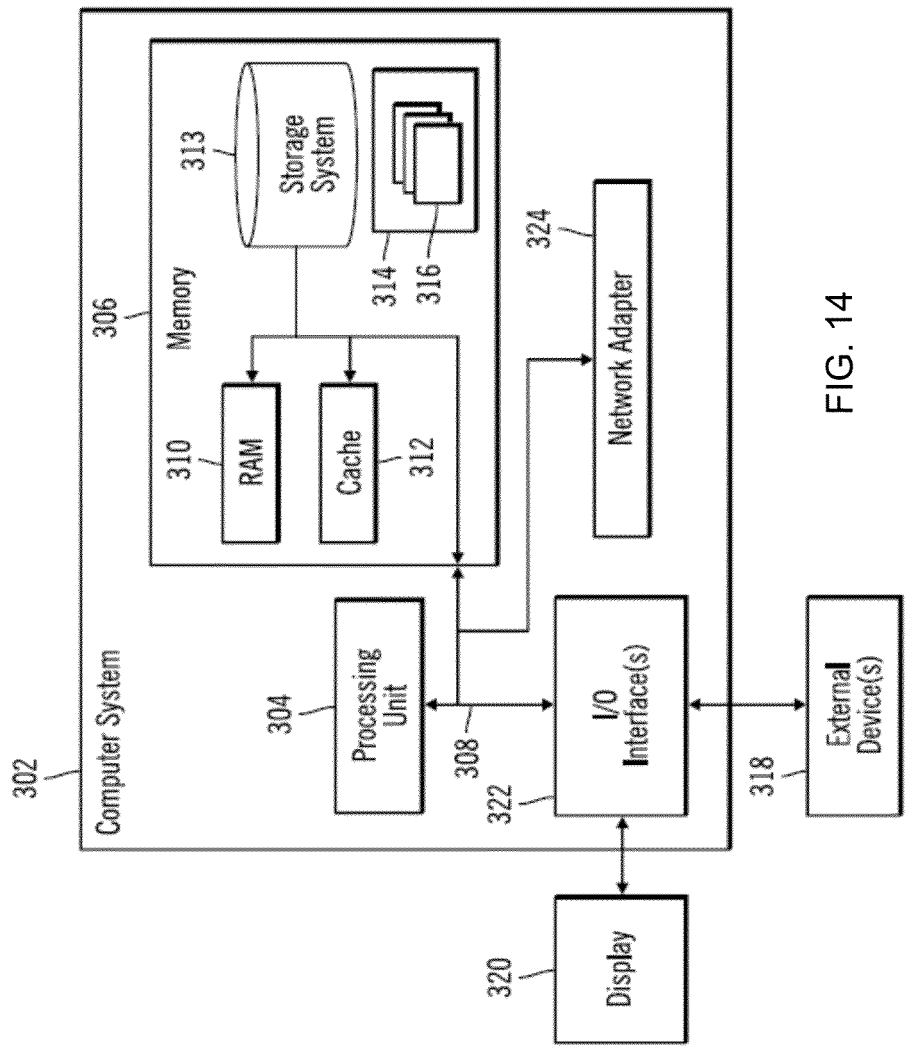
FIG. 14 illustrates an embodiment of a computing environment.

The elements of the computing environment of FIG. 1, including the application server 4 and components 16, 18, 20, engine server 6 and component 24, repository 8, and file system 11 may be implemented in one or more computer systems, such as the computer system 302 shown in FIG. 14. Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, the computer system/server 302 is shown in the form of a general-purpose computing device. The components of computer system/server 302 may include, but are not limited to, one or more processors or processing units 304, a system memory 306, and a bus 308 that couples various system components including system memory 306 to processor 304. Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 316 which generally carry out the functions and/or methodologies of embodiments of the invention as described herein. The components 18, 24, 28, 48, and 50 of the computing environment 1 may be implemented in one or more computer systems 302, where if they are implemented in multiple computer systems 302, then the computer systems may communicate over a network.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing schemas in a storage system, wherein the computer program product comprises a hardware computer readable storage medium having computer readable program code embodied therein that executes to perform operations, the operations comprising:
generating a presentation of a schema in a GUI comprised of multiple type nodes in a tree structure, wherein each type node comprises a hierarchical arrangement of a plurality of nodes including group nodes including a plurality of nodes and content nodes providing values;
receiving first user input in the GUI selecting one of the type nodes in the schema for a view;
receiving second user input in the GUI selecting one of the nodes in the selected type node in the schema comprising a sub-node of the selected type node for a view;
receiving third user input in the GUI selecting to create the selected sub-node of the selected type node as a root node of the schema for the view;
generating and editing the view to include the root node and at least one sub node of the root node and the sub-node of the selected type node;
adding the view as a child to the selected type node.

2. The computer program product of claim 1, wherein the operations further comprise:
rendering a GUI presenting the nodes of the schema; and
rendering in the GUI a representation of the view as the child to the selected type node.

3. The computer program product of claim 2, wherein the operations further comprise:
rendering a first panel of the GUI including the nodes of the schema and including the representation of the view as the child of the selected type node;
receiving user selection of the view rendered in the first panel;
rendering in a second panel of the GUI a hierarchical arrangement of the sub nodes included in the selected view.

4. The computer program product of claim 1, wherein the selected root node for the view comprises one of: (i) one of the nodes in the schema that is an ancestor to a selected node in the hierarchical arrangement or (ii) the selected node.

5. A computer program product for processing schemas in a storage system, wherein the computer program product comprises a hardware computer readable storage medium having computer readable program code embodied therein that executes to perform operations, the operations comprising:
generating a presentation of a schema in a GUI comprised of multiple type nodes organized in a tree structure, wherein each type node comprises a hierarchical arrangement of a plurality of nodes including group nodes including a plurality of nodes and content nodes providing values;
receiving first user input in the GUI selecting one of the type nodes in the schema for a view;
receiving second user input in the GUI selecting one of a plurality of sub-nodes of the selected type node as a root view node of the view;
generating graphical controls in the GUI enabling the user to add or remove sub nodes of the root view node to the view;
receiving first user selection of the graphical controls to add at least one of the sub nodes of the root view node to the view;
receiving second user selection of the graphical controls to remove at least one of the sub nodes of the root view node from the view; and
generating a view node for the root view node and for each sub node the user selected to include in the view.

6. The computer program product of claim 5, wherein the graphical controls enable the user to indicate the sub nodes of root view node as one of:
unselected, indicating that the sub node and descendants of the sub node are not included in the view;
tree selected indicating that the sub node and all descendants of the sub node are included in the view; and
selected, indicating, that at least one of the sub node and a subset of the descendants of the sub node are included in the view.

7. The computer program product of claim 5, wherein the schema indicates that sub nodes of a group node are optional or not optional, wherein sub nodes that are not optional are required nodes for the group node and sub nodes that are optional are not required nodes for the group node, wherein the graphical controls only enable the user to select to add or remove sub nodes indicated as optional with respect to the root view node for the view.

8. The computer program product of claim 7, wherein the graphical controls that enable the user to add or remove sub nodes indicated as optional include:
graphical controls to enable the user to select to add or remove all optional descendant sub nodes from the root view node with respect to the view
graphical controls to enable the user to select to add or remove all optional descendants from the sub nodes of the root view node; and
graphical controls to enable the user to select to add or remove all descendants of one of the optional sub nodes of the root view node.

9. The computer program product of claim 5, wherein the graphical controls enable the user to indicate that one sub node of the root view node is chunked, wherein for the chunked sub node, the sub nodes and the data for the sub nodes are consolidated into a string that is stored in the chunked sub node, wherein the view node for the chunked sub node indicates the view node as chunked.

10. The computer program product of claim 5, wherein the schema comprises an XML schema defined in at least one of XML XSD file.

11. A system for processing schemas in a storage system, comprising:
   a processor; and
   a hardware computer readable storage medium having computer readable program code embodied therein executed by the processor to perform operations, the operations comprising:
      generating a presentation of a schema in a GUI comprised of multiple type nodes in a tree structure, wherein each type node comprises a hierarchical arrangement of a plurality of nodes including group nodes including a plurality of nodes and content nodes providing values;
      receiving first user input in the GUI selecting one of the type nodes in the schema for a view;
      receiving second user input in the GUI selecting one of the nodes in the selected type node in the schema comprising a sub-node of the selected type node for a view;
      receiving third user input in the GUI selecting to create the selected sub-node of the selected type node as a root node of the schema for the view;
      generating and editing the view to include the root node and at least one sub node of the root node and the sub-node of the selected type node; and
      adding the view as a child to the selected type node.

12. The system of claim 11, wherein the operations further comprise:
   rendering a GUI presenting the nodes of the schema; and
   rendering in the GUI a representation of the view as the child to the selected type node.

13. The system of claim 12, wherein the operations further comprise:
   rendering a first panel of the GUI including the nodes of the schema and including the representation of the view as the child of the selected type node;
   receiving user selection of the view rendered in the first panel; and
   rendering in a second panel of the GUI a hierarchical arrangement of the sub nodes included in the selected view.

14. The system of claim 11, wherein the selected root node for the view comprises one of: (i) one of the nodes in the schema that is an ancestor to a selected node in the hierarchical arrangement or (ii) the selected node.

15. A system computer program product for processing schemas in a storage system, comprising:
   a processor; and
   a hardware computer readable storage medium having computer readable program code embodied therein executed by the processor to perform operations, the operations comprising:
      generating a presentation of a schema in a GUI comprised of multiple type nodes organized in a tree structure, wherein each type node comprises a hierarchical arrangement of a plurality of nodes including group nodes including a plurality of nodes and content nodes providing values;
      receiving first user input in the GUI selecting one of the type nodes in the schema for a view;
      receiving second user input in the GUI selecting one of a plurality of sub-nodes of the selected type node as a root view node of the view;
      generating graphical controls in the GUI enabling the user to add or remove sub nodes of the root view node to the view;
      receiving first user selection of the graphical controls to add at least one of the sub nodes of the root view node to the view;
      receiving second user selection of the graphical controls to remove at least one of the sub nodes of the root view node from the view; and
      generating a view node for the root view node and for each sub node the user selected to include in the view.

16. The system of claim 15, wherein the graphical controls enable the user to indicate the sub nodes of root view node as one of:
   unselected, indicating that the sub node and descendants of the sub node are not included in the view;
   tree selected indicating that the sub node and all descendants of the sub node are included in the view; and
   selected, indicating, that at least one of the sub node and a subset of the descendants of the sub node are included in the view.

17. The system of claim 15, wherein the schema indicates that sub nodes of a group node are optional or not optional, wherein sub nodes that are not optional are required nodes for the group node and sub nodes that are optional are not required nodes for the group node, wherein the graphical controls only enable the user to select to add or remove sub nodes indicated as optional with respect to the root view node for the view.

18. The system of claim 17, wherein the graphical controls that enable the user to add or remove sub nodes indicated as optional include:
   graphical controls to enable the user to select to add or remove all optional descendant sub nodes from the root view node with respect to the view
   graphical controls to enable the user to select to add or remove all optional descendants from the sub nodes of the root view node; and
   graphical controls to enable the user to select to add or remove all descendants of one of the optional sub nodes of the root view node.

19. The system of claim 15, wherein the graphical controls enable the user to indicate that one sub node of the root view node is chunked, wherein for the chunked sub node, the sub nodes and the data for the sub nodes are consolidated into a string that is stored in the chunked sub node, wherein the view node for the chunked sub node indicates the view node as chunked.

20. The system of claim 15, wherein the schema comprises an XML schema defined in at least one of XML XSD file.

21. A method for processing schemas in a storage system, comprising:
   generating in a computer readable storage medium a presentation of a schema in a GUI comprised of multiple type nodes in a tree structure, wherein each type node comprises a hierarchical arrangement of a plurality of nodes including group nodes including a plurality of nodes and content nodes providing values;
   receiving first user input in the GUI selecting one of the type nodes in the schema for a view;
   receiving second user input in the GUI selecting one of the nodes in the selected type node in the schema comprising a sub-node of the selected type node for a view;
   receiving third user input in the GUI selecting to create the selected sub-node of the selected type node as a root node of the schema for the view;

generating and editing the view to include the root node and at least one sub node of the root node and the sub-node of the selected type node;

adding the view as a child to the selected type node.

22. The method of claim 21, wherein the operations further comprise:

rendering a graphical user interface (GUI) presenting the nodes of the schema; and rendering in the GUI a representation of the view as the child o the selected type node.

23. The method of claim 22, wherein the operations further comprise further comprise:

rendering a first panel of the GUI including the nodes of the schema and including the representation of the view as the child of the selected type node;

receiving user selection of the view rendered in the first panel;

rendering in a second panel of the GUI a hierarchical arrangement of the sub nodes included in the selected view.

24. The method of claim 21, wherein the selected root node for the view comprises one of: (i) one of the nodes in the schema that is an ancestor to a selected node in the hierarchical arrangement or (ii) the selected node.

25. A method for processing schemas in a storage system, comprising:

generating in a computer readable storage medium a presentation of a schema in a GUI comprised of multiple type nodes organized in a tree structure, wherein each type node comprises a hierarchical arrangement of a plurality of nodes including group nodes including a plurality of nodes and content nodes providing values;

receiving first user input in the GUI selecting one of the type nodes in the schema for a view;

receiving second user input in the GUI selecting one of a plurality of sub-nodes of the selected type node as a root view node of the view;

generating graphical controls in the GUI enabling the user to add or remove sub nodes of the root view node to the view;

receiving first user selection of the graphical controls to add at least one of the sub nodes of the root view node to the view;

receiving second user selection of the graphical controls to remove at least one of the sub nodes of the root view node from the view; and generating a view node for the root view node and for each sub node the user selected to include in the view.

26. The method of claim 25, wherein the graphical controls enable the user to indicate the sub nodes of root view node as one of:

unselected, indicating that the sub node and descendants of the sub node are not included in the view;

tree selected indicating that the sub node and all descendants of the sub node are included in the view; and selected, indicating, that at least one of the sub node and a subset of the descendants of the sub node are included in the view.

27. The method of claim 25, wherein the schema indicates that sub nodes of a group node are optional or not optional, wherein sub nodes that are not optional are required nodes for the group node and sub nodes that are optional are not required nodes for the group node, wherein the graphical controls only enable the user to select to add or remove sub nodes indicated as optional with respect to the root view node for the view.

28. The method of claim 27, wherein the graphical controls that enable the user to add or remove sub nodes indicated as optional include:

graphical controls to enable the user to select to add or remove all optional descendant sub nodes from the root view node with respect to the view graphical controls to enable the user to select to add or remove all optional descendants from the sub nodes of the root view node; and graphical controls to enable the user to select to add or remove all descendants of one of the optional sub nodes of the root view node.

29. The method of claim 25, wherein the graphical controls enable the user to indicate that one sub node of the root view node is chunked, wherein for the chunked sub node, the sub nodes and the data for the sub nodes are consolidated into a string that is stored in the chunked sub node, wherein the view node for the chunked sub node indicates the view node as chunked.

30. The method of claim 25, wherein the schema comprises an XML schema defined in at least one of XML XSD file.

* * * * *